No. 12,491.
REISSUED JUNE 5, 1906.
J. W. BILES.
DRIER.
APPLICATION FILED MAR. 5, 1906.
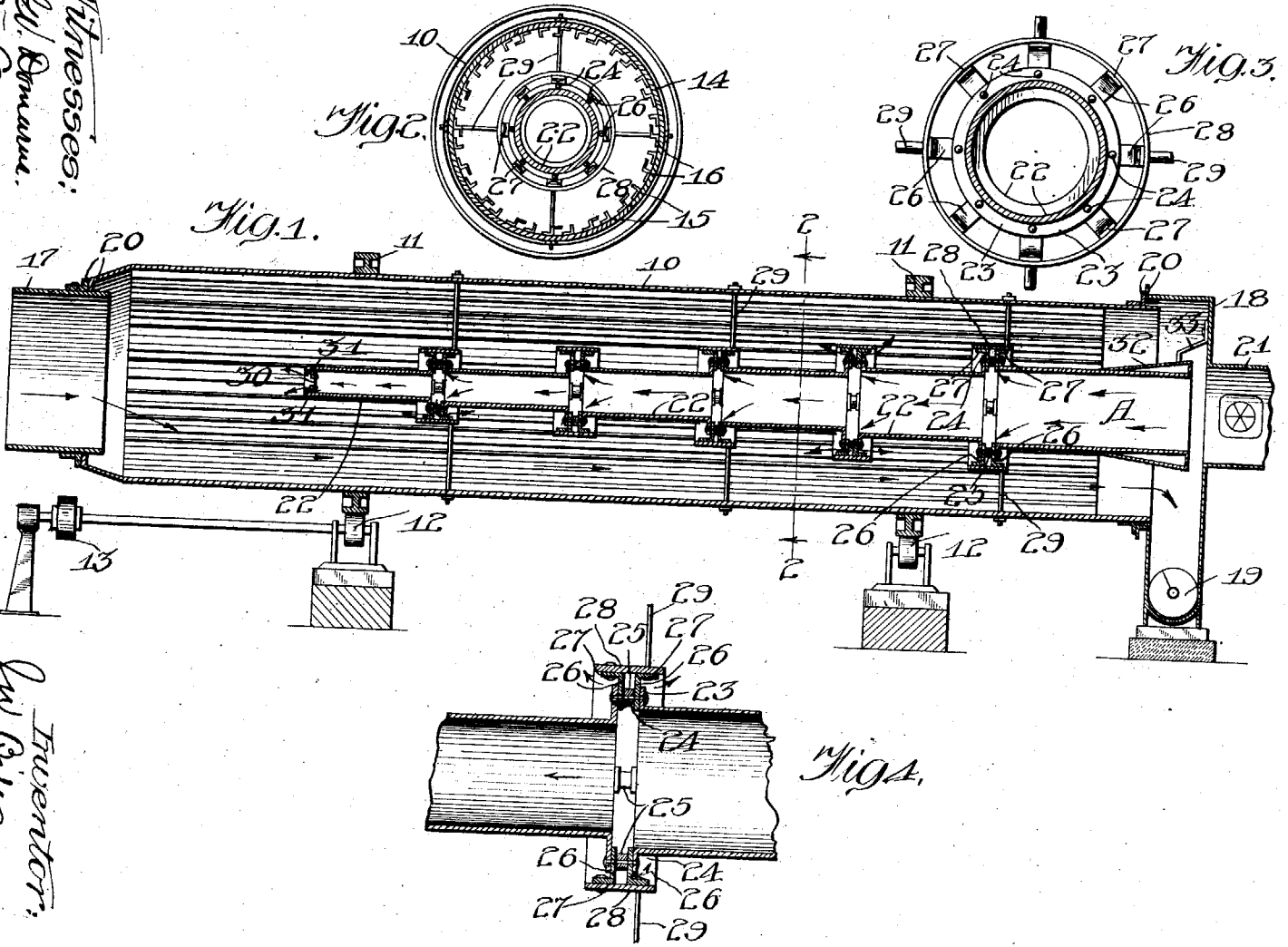
Witnesses:
G. Domaine.
J. H. Jochum, Jr.
Inventor:
J. W. Biles
by Brownson & Hopkins
Attys

UNITED STATES PATENT OFFICE.

JOHN W. BILES, OF LOUISVILLE, KENTUCKY, ASSIGNOR TO HIMSELF, COMMITTEE OF CHARLES H. MANTLE, OF LOUISVILLE, KENTUCKY.

DRIER.

No. 12,491. Specification of Reissued Letters Patent. Reissued June 5, 1906.

Original No. 807,997, dated December 19, 1905. Application for reissue filed March 5, 1906. Serial No. 304,414.

*To all whom it may concern:*

Be it known that I, JOHN W. BILES, a citizen of the United States, residing at Louisville, in the county of Jefferson and State of Kentucky, have invented certain new and useful Improvements in Driers, of which the following is a full, clear, and exact specification.

This invention relates to improvements in driers, and more particularly to the means for applying heat thereto; and the object of the same is to provide an improved conduit for the heating or drying fluid which will uniformly distribute the heat to the drying-chamber without danger of scorching the material operated upon.

A further object is to provide an improved construction of heat-conduit any section of which may be readily removed for repairs, &c.

A further object is to provide an improved construction of drier which will direct the heating or drying fluid in both directions in the drying-chamber.

A further object is to provide an improved manner of engaging the material to be dried on both sides with the heating or drying fluid during the passage of the material through the drying-chamber.

A further object is to provide an improved form of deflector and support for the heat-conduit.

A further object is to provide an improved form of a device of this character which will be simple in construction and cheap to manufacture and efficient in operation.

To the attainment of these ends and the accomplishment of other new and useful objects as will appear, the invention consists in the features of novelty in the construction, combination, and arrangement of the various parts as hereinafter more fully described and claimed, and shown in the accompanying drawings, illustrating an exemplification of this invention, and in which—

Figure 1 is a central vertical longitudinal sectional view of a drier constructed in accordance with the principles of this invention. Fig. 2 is a vertical transverse sectional view on line 2 2 of Fig. 1. Fig. 3 is an enlarged detail sectional view of the heating-conduit, showing one of the deflectors associated therewith; and Fig. 4 is an enlarged longitudinal sectional detail of the adjacent ends of two of the conduit-sections.

Referring more particularly to the drawings, in which similar reference characters designate the same parts throughout the several views, the numeral 10 designates a drying-chamber, preferably in the form of a cylinder, supported upon peripheral rings 11, disposed adjacent the ends, and said rings rest upon suitably-journaled rollers 12 12. This chamber or cylinder 10 may be rotated in any desired manner, but preferably by means of a pulley 13, fixed upon an extension of the journal of one of the supporting-rollers 12, which is driven from any suitable source of power.

If desired, an inner lining 14 may be provided for the chamber or cylinder, and said lining may be of any material suitable for the purpose.

Secured within the cylinder or chamber 10 and extending longitudinally thereof are elevating members or flights 15 and 16, which are preferable in the form of L and Z shaped bars, alternately arranged.

Secured to one end and extending into the cylinder or chamber 10 is a stationary throat or tube 17, through which the material to be dried is introduced into the chamber. The opposite or discharge end of the chamber is disposed to project into a stationary casing or head 18, and located in this head or casing is a suitably-arranged discharge conveyer or chute 19.

Circumferential flanges or contacting faces 20 20 may be applied to the chamber adjacent the casing or head 18 and the tube or throat 17 to insure tight joints for preventing the escape of the material or the heating medium. A conduit 21 for conducting a heated fluid and leading from a suitable source of supply is connected to and discharges into the head or casing 18.

Disposed longitudinally within the cylinder or chamber 10 in a direct line with the supply-conduit 21 and with its adjacent end in close proximity to the end of the supply-conduit is a heating-conduit, (designated generally by the reference character A.) This conduit A extends substantially the entire length of the chamber 10, terminating in proximity to the inlet tube or throat 17, and is preferably comprised of a plurality of tubular sections 22, which gradually decrease in diameter as they progress from the discharge end of the chamber toward the inlet end thereof.

At the adjacent ends of the sections are opposed and outwardly-extending projections or flanges 23. Disposed between these opposed flanges and in such a manner as to space the adjacent ends of the sections to form circumferential openings are suitable spacing blocks or thimbles 25, and the sections are held in position by means of bolts or rivets 24, passing through the flanges 23 and thimbles 25.

The numeral 26 designates arms or brackets, each of which is provided with an angular extremity 27. The end opposite the angular portion is secured to the flange or projection 23 in any suitable manner, but preferably between the flange or projection 23 and the spacing blocks or thimbles 25 and by means of the bolts or rivets 24. These arms or brackets are preferably opposed to each other with the angular extremities 27 disposed in opposite directions.

Secured to and supported by the portion 27 of the arms or brackets 26 and surrounding each of the spaces formed between the sections is a deflecting-ring 28, and said arms or brackets are of a length to hold the deflector-ring 28 spaced from the periphery of the heating-conduit A.

A plurality of rods or bars 29, one end of which is preferably secured to the deflector-rings 28, radiate from the deflectors and have their free ends attached or secured to the cylinder or chamber 10, thus serving to support the heating-conduit A axially of said chamber and prevent displacement thereof. The end of the heating-conduit A adjacent the inlet tube or throat 17 is preferably closed by means of a head 30, which is of a diameter slightly less than the internal diameter of the end of the conduit A, and said head is secured and retained in position within the end of the conduit in any suitable manner, preferably by means of angular brackets 31.

In order to insulate the end of the conduit A at which the heating fluid from the supply-conduit enters therein to avoid the scorching of the material by the comparatively high temperature at this point, an outer or spaced wall 32 preferably surrounds the conduit. This wall is so disposed and held in position as to converge from one extremity of the end section toward the opposite extremity thereof to form a dead-air space.

A suitable shield 33 may be secured within the head or casing 18 and is arranged to extend over the space between the extremity of the heating-conduit A and the wall of the casing to prevent the material from dropping through the space and directly in the path of the entering heating medium.

The operation of this form of the invention is as follows: The cylinder or chamber being rotated at the desired rate of speed, the material to be dried is introduced through the tube or throat 17 into the cylinder, where it is caught by the flights or elevating members 15 16 and raised to such a point that the position of the members or flights will drop the material through the cylinder or chamber upon and in proximity to the heating-conduit A. At the same time the material is advanced from the inlet to the discharge end in any desired manner, either by disposing the members or flights 15 16 in such a position as to force the material forward or by placing the cylinder or chamber in an inclined position, with the inlet end thereof elevated to any desired height. The heating medium, which in this exemplification of the invention may be heated fluid, enters the conduit A at the discharge end of the cylinder or chamber 10, passes toward the feed end thereof and in a direction opposed to the direction of travel of the entering material, and being checked by the decrease in diameter between the sections of the conduit is retarded and passes through the intermediate spaces and strikes the encircling rings or deflectors 28, which will deflect the same in both directions into the cylinder or chamber 10 and cause it to engage the advancing material on both sides. The rings or deflectors 28 also serve in the capacity of shields or guards to prevent the falling material from entering the spaces between the conduit-sections, and the projections or flanges 23 serve to prevent the material from moving for any great distance along and in contact with the exterior of the conduit A and into the spaces. The successive sections may approximate in diameter the quantity of fluid which is present in the conduit for discharge at each space, and the opening between the last section and the periphery of the head 30 permits the outflow of the remainder of the fluid. After the material has been subjected to the blasts of the heated fluid from each of the spaces and also from the radiation of the sections themselves as it advances through the cylinder or chamber it is discharged therefrom to a conveyer which is located, preferably, in close proximity thereto and without endangering the material by the intensity of the heat of the entering fluid at that point. By thus arranging and constructing the conduit any one of the sections may be removed for repairs or for any other desired purpose by simply removing the connecting or securing bolts or rivets 24.

It is to be understood that it is not desired to be limited to the specific details of construction or arrangement of the several parts, as numerous changes may be made therein without departing from the spirit of the invention.

What is claimed as new is—

1. The combination of a drying-chamber, a heating-conduit within the chamber and provided with an outlet, and means spaced from and operatively related to the outlet for discharging the fluid from the conduit into the chamber in opposite directions.

2. The combination of a drying-chamber, a heating-conduit therein provided with a discharge-opening, and means spaced from and operatively related to the opening for deflecting the fluid in opposite directions within the chamber.

3. In a device of the class described, the combination of a chamber through which the material to be treated passes, and a heat-conduit within the chamber, said conduit being provided with a discharge-opening, means coöperating with the opening and disposed to direct the fluid from the conduit into the chamber in opposite directions to engage the material on both sides during its passage through the chamber.

4. In a device of the class described, the combination of a chamber through which the material to be treated passes, a conduit within the chamber adapted to receive a fluid, said conduit being provided with a discharge-opening, and means operatively related to the opening for deflecting the fluid discharged from the conduit in opposite directions within the chamber, to engage the material on both sides during its progress through the chamber.

5. In a device of the class described, the combination of a chamber through which the material to be treated passes longitudinally, a fluid-conduit within the chamber, said conduit being provided with a discharge-opening, means coöperating with the opening and disposed to direct the fluid against the material in a direction in line with the path of its longitudinal movement through the cylinder and also in a direction opposed to its path of movement therethrough.

6. The combination of a chamber through which the material to be treated passes longitudinally, a fluid-conduit within the chamber, adapted to receive the fluid in a direction opposed to the path of movement of the material, said conduit being provided with a discharge-opening within the chamber, and means operatively related to the opening for deflecting the fluid against the material in line with its path of movement and also in a line opposed to its path of movement as the material advances through the chamber.

7. In a device of the class described, the combination of a drying-chamber, a heating-conduit within the chamber, and provided with a discharge-opening, and a spaced deflector surrounding the discharge-opening for deflecting the fluid in opposite directions.

8. In a device of the class described, the combination of a drying-chamber, a heating-conduit within the chamber and provided with discharge-openings, deflectors surrounding the discharge-openings, and means for spacing the deflectors from the conduit and supporting the same over the discharge-openings.

9. The combination with a drying-chamber, of a heating-conduit extending into the chamber and comprising sections between which are spaces, and deflectors extending outside the sections and opening at each side of the spaces.

10. The combination with a drying-chamber, of a heating-conduit extending into the chamber and comprising spaced sections, deflector-rings spaced from the conduit, surrounding and extending across the openings formed between the adjacent ends of the sections.

11. The combination of a drying-chamber, a heating-conduit extending into the chamber and comprising a plurality of sections, means disposed between the adjacent ends of the sections for separating the same to form spaces therebetween, deflectors surrounding the spaces and extending across the same, and means for supporting said deflectors out of contact with the conduit.

12. The combination of a drying-chamber, a heating-conduit extending into the chamber and comprising spaced sections, the diameter of each successive section being smaller than its adjacent section, and encircling deflecting-rings spaced from the conduit and standing across the spaces formed between the adjacent ends of the sections.

13. The combination of a drying-chamber, a heating-conduit extending into the chamber and comprising a plurality of sections, each successive section being of a smaller diameter than the adjacent section, means disposed between the adjacent ends of the sections for separating the same to form spaces therebetween, deflectors surrounding the spaces and extending across the same, and means for supporting the deflectors out of contact with the conduit.

14. The combination of a drying-chamber, a heating-conduit extending into the chamber and comprising spaced sections, the diameter of each successive section being smaller than its adjacent section, and means disposed adjacent the space between the adjacent sections for deflecting the fluid into the chamber in opposite directions.

15. The combination with a drying-chamber, of a heating-conduit extending into the chamber and comprising separated sections having at their adjacent ends outward projections, and deflectors carried by the projections.

16. The combination of a drying-chamber, a heating-conduit extending into the chamber and comprising a plurality of separated sections, the diameter of each successive section being less than the diameter of the adjacent section, each of the sections having at their adjacent ends outward projections, and deflectors carried by the projections.

17. The combination with a drying-chamber, of a heating-conduit extending into the chamber and comprising sections having at their adjacent ends outward projections, and spacing members interposed between the projections.

18. The combination with a drying-chamber, of a heating-conduit extending into the chamber and comprising a plurality of sections, the diameter of each successive section being less than the diameter of the adjacent section, each of the sections having at their adjacent ends outward projections, and spacing members interposed between the projections.

19. The combination with a drying-chamber, of a heating-conduit extending into the chamber and comprising sections having at their adjacent ends outward projections, spacing members introduced between the projections, and deflecting-rings supported upon the projections.

20. The combination of a drying-chamber, a heating-conduit extending into the chamber and comprising a plurality of sections, the diameter of each successive section being less than the adjacent section, each of the sections having at their adjacent ends outward projections, spacing members introduced between the projections, and deflecting-rings supported upon the projections.

21. The combination of a drying-chamber, a heating-conduit extending into the chamber and provided with radial discharge-openings, and an independent concentric deflector-ring, spaced from and surrounding each of the openings, said rings being of a width greater than the openings.

22. The combination of a drying-chamber, a heating-conduit extending into the chamber and provided with discharge-openings, deflectors covering the openings and supported by the conduit, and rods, one end of which are attached to the chamber and the other end secured to the deflectors for supporting the conduit.

23. The combination of a drying-chamber, a heating-conduit extending into the chamber and comprising spaced sections, deflector-rings supported by the conduit and surrounding the spaces between the sections, and tie-rods, one end of which are secured to the chamber and the other end to the deflector-rings for preventing displacement of the conduit.

24. The combination of a drying-chamber, a heating-conduit extending into the chamber and comprising spaced sections, the openings between said sections being disposed in different vertical planes and means operatively related to the spaces for directing the fluid discharged into the chamber through the openings, in opposite directions therein and in different planes.

25. The combination of a drying-chamber, a heating-conduit extending into the chamber and comprising a plurality of spaced sections, the openings between the sections being disposed in different vertical planes and a deflector coöperating with each of the spaces for deflecting the fluid discharged into the chamber in opposite directions therein, each of said deflectors being located in a different plane to each other.

26. The combination of a drying-chamber, a heating-conduit extending into the chamber and provided with a plurality of discharge-openings arranged in different vertical planes and means operatively related to the openings for deflecting the fluid discharged into the chamber longitudinally in opposite directions therein and in different vertical planes.

27. The combination of a drying-chamber, a heating-conduit extending into the chamber and provided with radial discharge-openings, and independent concentric deflector-rings spaced from and surrounding each of the openings, each of said rings being of a different diameter and of a width greater than the openings.

28. The combination of a drying-chamber, a heating-conduit extending into the chamber and comprising spaced sections, and a deflector-ring spaced from the conduit, surrounding and extending across each of the openings formed between the adjacent ends of the sections, said rings being of a different diameter.

29. The combination of a drying-chamber, a heating-conduit extending into the chamber and comprising spaced sections, the diameter of each successive section being smaller than its adjacent section, and an encircling deflector-ring spaced from the conduit, and standing across the spaces formed between the adjacent ends of the sections, the diameter of each successive ring being smaller than the diameter of its adjacent ring.

In testimony whereof I have hereunto signed my name, in the presence of two witnesses, this 27th day of February, 1906.

JOHN W. BILES.

Witnesses:

STANLEY BONNER,
S. H. ABSHER.